United States Patent
Nobis et al.

(10) Patent No.: US 8,522,609 B2
(45) Date of Patent: Sep. 3, 2013

(54) METHOD AND DEVICE FOR WHEEL SUSPENSION ALIGNMENT

(75) Inventors: Guenter Nobis, Nuertingen (DE);
Steffen Abraham, Hildesheim (DE);
Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 306 days.

(21) Appl. No.: 12/736,368

(22) PCT Filed: Mar. 26, 2009

(86) PCT No.: PCT/EP2009/053601
§ 371 (c)(1),
(2), (4) Date: Dec. 22, 2010

(87) PCT Pub. No.: WO2009/130103
PCT Pub. Date: Oct. 29, 2009

(65) Prior Publication Data
US 2011/0100107 A1      May 5, 2011

(30) Foreign Application Priority Data
Apr. 23, 2008    (DE) .......................... 10 2008 001 339

(51) Int. Cl.
*G01M 17/04*          (2006.01)
(52) U.S. Cl.
USPC ....................................... 73/117.03
(58) Field of Classification Search
USPC ............................ 73/117.01, 117.02, 117.03
See application file for complete search history.

(56) References Cited

U.S. PATENT DOCUMENTS

| | | | |
|---|---|---|---|
| 5,675,515 A | 10/1997 | January | |
| 5,969,246 A | 10/1999 | Jackson et al. | |
| 6,134,792 A | 10/2000 | January | |
| 6,148,528 A * | 11/2000 | Jackson | 33/288 |
| 6,657,711 B1 * | 12/2003 | Kitagawa et al. | 356/155 |
| 6,739,185 B2 * | 5/2004 | Schoeninger | 73/146 |
| 7,089,776 B2 * | 8/2006 | Dale, Jr. | 73/1.75 |
| 2008/0289202 A1 * | 11/2008 | Kassouf et al. | 33/288 |
| 2009/0031782 A1 * | 2/2009 | Jackson et al. | 73/1.75 |
| 2011/0179656 A1 * | 7/2011 | Rogers | 33/203.18 |
| 2011/0185584 A1 * | 8/2011 | Kassouf et al. | 33/288 |

FOREIGN PATENT DOCUMENTS

| | | |
|---|---|---|
| CN | 101124454 | 2/2008 |
| CN | 101160505 | 4/2008 |
| DE | 29 48 573 | 6/1981 |
| DE | 44 19 584 | 12/1995 |
| DE | 197 57 763 | 7/1999 |
| EP | 89 50 56 | 2/1999 |
| EP | 104 2 643 | 10/2000 |
| WO | 94/05969 | 3/1994 |
| WO | 03/089876 | 10/2003 |

* cited by examiner

*Primary Examiner* — Eric S McCall
(74) *Attorney, Agent, or Firm* — Kenyon & Kenyon LLP

(57) ABSTRACT

A method for wheel suspension alignment includes: providing four measuring heads each having a monocular picture recording device; recording at least three geometrical details of one wheel, respectively, of a vehicle in an initial position, using each of the four measuring heads; carrying out relative motion between the vehicle and the measuring heads from the initial position into at least one further position; recording at least three geometrical details of one wheel, respectively, of the vehicle in the further position, using each of the four measuring heads; carrying out local 3D reconstructions for determining translation vectors, rotation vectors and wheel rotational angles between the at least two positions, and wheel rotational centers and wheel rotational axes from the recorded geometrical details; determining a global scale for the measuring heads by scaling the translation vectors to have the same length; and determining camber, single toe and/or total toe of the vehicle.

11 Claims, 2 Drawing Sheets

METHOD AND DEVICE FOR WHEEL SUSPENSION ALIGNMENT

FIELD OF THE INVENTION

The present invention relates to wheel suspension alignment, especially to a method and a device for optical wheel suspension alignment.

BACKGROUND INFORMATION

Documents DE 197 57 763 and EP 104 2643 discuss how the travel axis and the wheel geometrical data and the axle geometrical data may be ascertained with the aid of cameras, a reference coordinate system at the test site and optical features at the vehicle wheels and at the body. Both methods require a reference coordinate system, and rely on the measurement using binocular (stereo) picture recording devices. Such binocular picture recording devices require much effort and are costly.

U.S. Pat. No. 6,134,792 discusses an axis measuring system that relies on monocular picture recording devices. In order to obtain the three-dimensional information on the wheel position, optical targets are applied on the wheels on which features are located whose position is known in a local target coordinate system. The targets having these features are produced using high precision, and form a so-called pass point system. The production of such high-precision targets is costly. In an everyday repair shop environment, the high precision targets are easily damaged or deformed, which leads to uncontrollable measuring errors.

SUMMARY OF THE INVENTION

It is an object of the exemplary embodiments and/or exemplary methods of the present invention to provide a reliable, cost-effective and accurate method for wheel suspension alignment.

It is a further object of the exemplary embodiments and/or exemplary methods of the present invention to provide a device for carrying out the method according to the present invention.

This object is attained completely by the method and the devices according to the description herein.

The exemplary embodiments and/or exemplary methods of the present invention provides for recording geometric details present or applied on the wheels, using monocular picture recording devices in at least two layers, the vehicle being moved by the rolling of the wheels. The geometrical details on the wheel rotate about the rotational axis of the wheel, in this context. From the 2D picture coordinates of the imaged geometrical details measured in all the pictures taken, there are yielded their 3D coordinates in a local wheel coordinate system, the translation vectors and the rotation vectors of the vehicle and the angles of rotation of the wheel between the positions, as well as the data required for the axle alignment in the form of the 3D position of the rotational center and the spatial direction of the rotational axis. This computational step will be designated below as 3D reconstruction.

After the 3D reconstruction has taken place, the positions of the geometrical details in the wheel coordinate system form a passpoint system, so that subsequent measurements may be carried out in a standing vehicle, for example, for setting toe and camber in response to a detected malposition of the wheel. The 3D reconstruction only determines the form of the wheel coordinate system, not its scale. Each monocular picture recording device calculates its associated wheel coordinate system using a local scale, which is optionally specified in the reconstruction.

For the most important measured values in the axle alignment, which are based essentially on the calculation of angles, the scales of all the picture recording devices have to be known neither identically nor absolutely. Only when additionally metric measured values are to be determined or the single toe of the rear wheels, do the local scales have to be adjusted to one another. In the following, a common scale for all picture recording devices is designated as a global scale. By introducing an additional, dimensionally correct, external information, the global scale is adjusted to an absolute scale.

An additional recording of geometrical details at the body increases the accuracy of the determination of the translation and rotation vectors between the positions.

A method according to the present invention for wheel suspension alignment includes the steps:

Providing a wheel suspension alignment-system having four measuring heads, arranged in a known position to one another, of which each has a monocular picture recording device, whose picture recording does not necessarily have to take place synchronized in time.

Recording of at least three geometrical details each of one wheel of the vehicle standing in an initial position, using each of the four measuring heads;

Carrying out a relative motion between the vehicle, on the one hand, and the measuring heads, on the other hand, from the initial position into at least one further position, the relative position of the measuring heads to one another being known;

Recording the at least three geometrical details using each of the four measuring heads of the vehicle standing in the at least one further position;

Carrying out local 3D reconstructions for determining the translation vectors, the rotation vectors and the wheel rotational angles between the at least two positions, as well as of the wheel rotational centers and the wheel rotational axes of the wheels from the recorded geometrical details;

Determining a global scale for the measuring heads by scaling the translation vectors of the wheels, so that the translation vectors have the same length; and Determining camber, single toe and/or total toe of the vehicle.

In this method, the synchronization of the cameras takes place by a measurement at standstill.

An additional method according to the present invention for wheel suspension alignment includes the steps:

Providing a wheel suspension alignment system having four measuring heads, arranged in a known position to one another, of which each has a monocular picture recording device, whose picture recording is synchronized in time.

Carrying out a relative motion between the vehicle, on the one hand, and the measuring heads, on the other hand, at a constant or non-constant speed, the relative position of the measuring heads to one another being known;

Recording at least three geometrical details each of one wheel during the carrying out of the relative motion, using each of the four measuring heads that are synchronized with one another in time in the picture recording, in at least two positions of the vehicle;

Carrying out local 3D reconstructions for determining the translation vectors, the rotation vectors and the wheel rotational angle between the at least two positions, as well as of the wheel rotational centers and the wheel rotational axes of the wheels from the recorded geometrical details;

Determining a common, global scale for the measuring heads by scaling the translation vectors of the wheels, so that the translation vectors have the same length; and Determining camber, single toe and/or total toe of the vehicle.

In this method, the speed is not necessarily varied, i.e. it may be carried out at constant or non-constant speed.

An additional method according to the present invention for wheel suspension alignment includes the steps:

Providing a wheel suspension alignment system having four measuring heads, arranged in a known position to one another, that are not necessarily synchronized in time, of which each has a monocular picture recording device;

Carrying out a relative motion at non-constant speed between a vehicle, on the one hand, and the measuring heads, on the other hand, the relative position of the measuring heads to one another being known;

Recording at least three geometrical details each of one wheel of the vehicle during the carrying out of the relative motion, using each of the four measuring heads that are not synchronized with one another in time, in several positions;

Carrying out local 3D reconstructions for determining the translation vectors, the rotation vectors and the wheel rotational angle between the positions, the wheel rotational centers and the wheel rotational axes of the wheels from the recorded geometrical details;

Determining the motion profiles of the wheels from the recorded motions of the geometrical details;

Synchronizing the motion profiles of the wheels by adjusting the motion profiles with respect to position, shape and scale; and Determining camber, single toe and/or total toe of the vehicle.

In this method, the cameras are not necessarily synchronized and the speed is not constant. The synchronization takes place via the adjustment of the motion profile.

One device according to the present invention has a system of four measuring heads situated in a known position to one another, of which each has a monocular picture recording device and is equipped, in non-synchronized operation, using the picture recording device, to record, in each case, at least three geometrical details of one wheel, in an initial position in each case, and at least one additional position of the standing vehicle, and has an evaluation device that is equipped, during operation, to determine the translation and rotation vectors of the wheels from the motion of the recorded geometrical details, and to determine a global scale by scaling the translation vectors of the wheels in such a way that the translation vectors have the same length, and to determine the camber, single toe and/or the total toe of the vehicle.

One further device according to the present invention has a system of four measuring heads situated in a known position to one another, of which each has a monocular picture recording device and is equipped, in synchronized operation, using the picture recording device, to record, in each case, at least three geometrical details of one wheel, during the carrying out of a relative motion of the vehicle moved at constant or non-constant speed, and has an evaluation device that is equipped, during operation, to determine the translation and rotation vectors of the wheels from the motion of the recorded geometrical details, and to determine a common global scale, by scaling the translation vectors of the wheels, in such a way that the translation vectors have the same length, and to determine the camber, single toe and/or the total toe of the vehicle.

One further device according to the present invention has a system of four measuring heads situated in a known position to one another, of which each has a monocular picture recording device and is equipped, in non-synchronized operation, using the picture recording device, to record, in each case, at least three geometrical details of one wheel each, during the carrying out of the relative motion of the vehicle not moved at constant speed, and has an evaluation device that is equipped, during operation, to determine the motion profiles of the wheels from the recorded geometrical details, the translation and rotation vectors of the wheels from the recorded geometrical details, to synchronize the motion profiles of the wheels by adjusting the motion profiles in position, shape and scale and to determine the camber, single toe and/or the total toe of the vehicle.

The exemplary embodiments and/or exemplary methods of the present invention thus makes possible the wheel suspension alignment without using costly and painstaking binocular picture recording devices and/or precision targets. This also avoids measuring errors which are able to come about from damage to highly precise measuring targets. The measurement may be carried out simply and rapidly, since an exact positioning wheel adapter on the rotational axis of the wheels is not required, and one may do without the specification of an absolute scale.

In one specific embodiment, at least one of the geometrical details is a natural geometrical detail that is present on the wheel, such as the edge of a wheel rim or the valve of the wheel. Because of the use of a natural geometrical detail, one may save the steps of applying measuring targets and taking them off again after the measurement, so that the measurement can be carried out more rapidly.

In one specific embodiment, at least one of the geometrical details is a measuring target mounted on the wheel. Measuring targets have a high contrast and are thus especially easily detected by picture recording devices. The measuring targets may be applied using magnets or adhesive foil, for example. The measuring targets may be coded in order to simplify following the measuring targets during the motion.

Measuring targets on the body increase the accuracy in the determination of the translation and rotation vectors and in the recording of the steering motions and spring oscillations.

In one specific embodiment, several measuring targets are mounted on a common carrier, for instance, a wheel adapter. The carrier may be applied using a magnet or adhesive foil, for example, in order to mount several measuring targets on the wheel simultaneously, using only one mounting step.

In one specific embodiment, before the vehicle assessment, the position and the alignment of the measuring heads with respect to one another are made known once to the system by reference points fixed at the measuring location.

In one specific embodiment, during the vehicle assessment, the position and the alignment of the measuring heads with respect to one another are continuously made known to the system with the aid of reference points fixed at the measuring location.

In another specific embodiment, before and during the vehicle assessment, the position and the alignment of the measuring heads with respect to one another is determined using the device named in EP-1184640, and is made known to the system.

In one specific embodiment, the vehicle is driven through between the measuring heads. Thus, it is not necessary to design the measuring heads to be movable, and the relative position between the measuring heads is able to be held constant particularly simply and reliably.

In one further specific embodiment, in each case two measuring heads are positioned in such a way that they are opposite to each other symmetrically on both sides of the vehicle, and the vehicle is moved through in parallel to the axis of symmetry of the opposite measuring heads. Because of the symmetrical situation of the measuring heads and the motion of the vehicle, parallel to the axis of symmetry between the measuring heads, it is possible to determine the single toe of the rear wheels of the vehicle, without knowing the absolute scale of the measuring heads. The single toe of the rear wheels can thus be simply determined.

In one additional specific embodiment, at least one of the measuring heads additionally records metrically known data, in order to determine the scale absolutely and then to determine, in addition, the wheel base and the tread width of the vehicle. By determining an absolute scale, one is able to determine the wheel base and the tread width of the vehicle with great accuracy.

In one specific embodiment, the metrically known information is a known distance between two features of the vehicle. A known distance between two features of the vehicle makes available an absolute scale in an especially simple manner. The features of the vehicle may be features of the body, such as bumpers or wheel housings, features on the wheels, such as the rim edge or adapters or measuring targets mounted on the wheel.

In still another specific embodiment, the metrically known information is the distance covered by the vehicle. The method is simplified thereby.

In one specific embodiment, the speed of the vehicle is measured by speed sensors, and the distance covered is determined by the integration of the speed over time. By doing that, the distance covered may be determined particularly simply and reliably, and an absolute scale made available.

The exemplary embodiments and/or exemplary methods of the present invention is subsequently explained in greater detail with reference to the figures.

DETAILED DESCRIPTION

Figure 1:
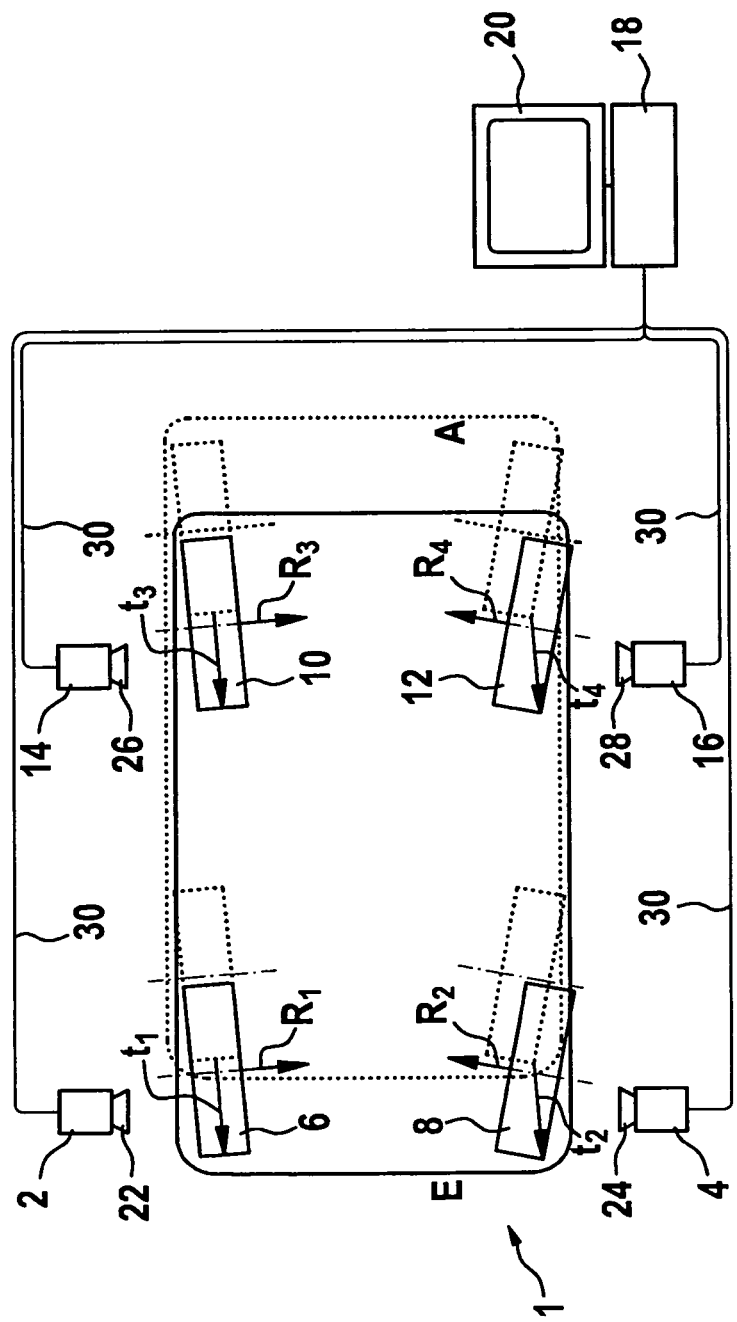
FIG. 1 shows the schematic representation of a device according to the present invention for assessing the wheel suspension geometry of a vehicle, as well as of a vehicle in the initial position and the end position, from above.

FIG. 1 shows the schematic representation of a device according to the present invention for measuring the wheel suspension geometry of a vehicle, from above.

The device has four measuring heads 2, 4, 14, 16, which are situated in each case pairwise opposite one another, on both sides of a vehicle 1. Measuring heads 2, 4, 14, 16, in each case on their side facing vehicle 1, each have a monocular picture recording device 22, 24, 26, 28, which is designed as a camera, for example. The position of measuring heads 2, 4, 14, 16 in the coordinate system of the measuring location is known, and is not changed during the measurement.

Vehicle 1 has four wheels 6, 8, 10, 12, and is situated between measuring heads 2, 4, 14, 16 in such a way that in each case one of wheels 6, 8, 10, 12 is positioned in the field of view of one of picture recording devices 22, 24, 26, 28. Measuring heads 2, 4, 14, 16 are connected via data lines 30 to an evaluation device 18 for evaluating the data recorded and ascertained by measuring heads 2, 4, 14, 16. Evaluation device 18 is connected to a display 20 for indicating the results of the measurement. Furthermore, evaluation device 18 is provided with an input device not shown in FIG. 1, for instance, a keyboard, for controlling evaluation device 18.

In FIG. 1, vehicle 1 is shown in an initial position A, shown by dotted lines, and a final position E, shown by solid lines. Final position E is located to the left of initial position A, in the horizontal direction.

To carry out the measurement, first of all, each of wheels 6, 8, 10, 12 is recorded in the initial position A of vehicle 1 by, in each case, one of picture recording devices 22, 24, 26, 28, and the position of at least three geometrical details of the respective wheel 6, 8, 10, 12 is recorded in the pictures.

Vehicle 1 is moved into final position E, and the position of the geometrical details is determined again in the pictures.

From the positions of the geometrical details in the pictures in initial position A of vehicle 1 and final position E of vehicle 1, and the formulation of a three-dimensional motion of a rigid body between the two positions, while introducing the rotational centers, the rotational axles and the rotational angle of the wheels, the 3D coordinates of the geometrical details may now be determined in the local coordinate system of respective measuring heads 2, 4, 14, 16, translation vectors $t_1$, $t_3$, $t_3$ and $t_4$ and rotation vectors $R_1$, $R_2$, $R_3$ and $R_4$ of wheels 6, 8, 10, 12. This may take place either by a logic in respective measuring heads 2, 4, 14, 16 or in evaluation device 18.

The geometrical details may naturally be geometrical details of wheel 6, 8, 10, 12, such as a rim edge, a valve, a design element or a character, or a measuring target mounted on wheel 6, 8, 10, 12. By using the natural geometrical details, the step of mounting and later taking down measuring targets may be saved, so that the measurement can be carried out more rapidly. On the other hand, measuring targets have a high contrast and are thus especially easily detected by picture recording devices 22, 24, 26, 28. Thus, measuring targets make possible an accurate wheel suspension alignment, especially also in response to poor lighting conditions.

Since the picture recording devices 22, 24, 26, 28 are monocular picture recording devices 22, 24, 26, 28, the position of the geometrical details in the three-dimensional coordinate system of respective measuring head 2, 4, 14, 16 is able to be determined, only except for an unknown scale factor between local and absolute scale, or rather, between a global and an absolute scale, if the local scales have been adjusted to each other.

Figure 2:
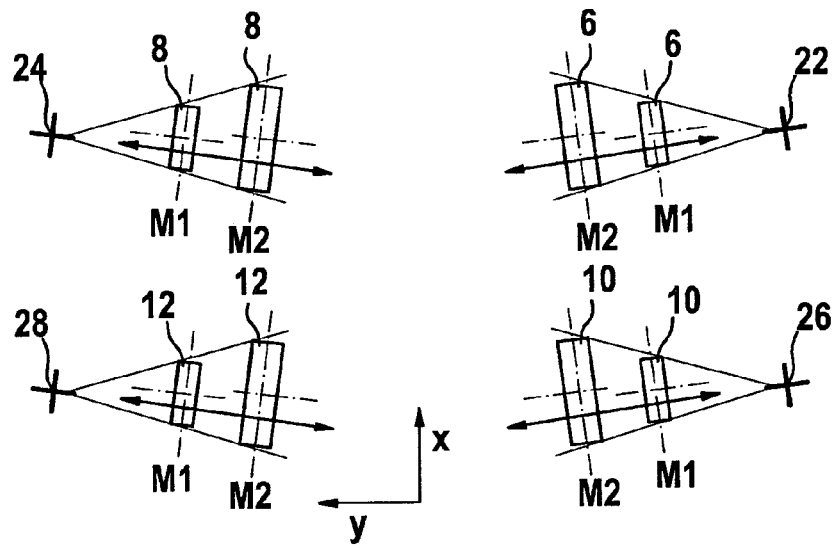
FIG. 2 schematically shows the 3D reconstruction of an axle geometry without a global scale.

FIG. 2 illustrates this scale uncertainty by an example. FIG. 2 shows a 3D reconstruction of wheels 6, 8, 10, 12 for two exemplary scales M1 and M2. In FIG. 2 it becomes clear that a change in scale leads to a scaling of all line loads by the same factor. The imaging of a large, distant object, in this case, wheels 6, 8, 10, 12, using scale M2, is identical to wheels 6, 8, 10, 12 diminished in size according to scale using scale M1, which are located at a lower distance from respective picture recording device 22, 24, 26, 28.

For this measurement, since vehicle 1 is to be regarded as a rigid body, the relative position of wheels 6, 8, 10, 12 with respect to one another does not change when vehicle 1 is moved from initial position A to final position E. Translation vectors $t_1$, $t_2$, $t_3$ and $t_4$ of wheels 6, 8, 10, 12 therefore have to have the same length in the global coordinate system. Therefore, the four local scales of measuring heads 2, 4, 14, 16 may be reduced to a common, global scale by scaling translation vectors $t_1$, $t_2$, $t_3$ and $t_4$ in such a way that they have the same length.

For scaling translation vectors $t_1$, $t_2$, $t_3$ and $t_4$ and for adjusting to a common scale, the recording of all four wheels 6, 8, 10, 12 by picture recording device 22, 24, 26, 28 of measuring heads 2, 4, 14, 16 has to be synchronized in time, so that the four wheels 6, 8, 10, 12 are in each case recorded in the same position of vehicle 1.

In the simplest variant, as described before, vehicle 1 is stopped in at least two positions, for instance, in an initial position A and a final position E, and the positions of the geometrical details are determined in these two positions of vehicle 1. An additional synchronization of the picture recording times is then not required. Vehicle 1 may also be stopped in further positions, in order to determine the positions of the geometrical details in these positions, and to increase the accuracy of the measurement.

In one alternative exemplary embodiment, the measurement is carried out using synchronized picture recording devices, without stopping vehicle 1 in at least two positions. To do this, vehicle 1 is moved past measuring heads 2, 4, 14, 16 at a constant or a non-constant speed. In so doing, the positions of the geometrical details are followed or "tracked" by known methods of image processing, such as KLT-Tracker, correlation methods or an allocation of the motion path in the picture over a picture sequence taken during the motion. If measuring targets are used, they may be coded in order to simplify following the measuring targets during the motion.

In one further alternative exemplary embodiment, the measurement is carried out using non-synchronized picture recording devices, without stopping vehicle 1 in at least two positions. To do this, vehicle 1 is moved past measuring heads 2, 4, 14, 16 at a non-constant speed. In so doing, the positions of the geometrical details are followed or "tracked" by known methods of image processing, such as KLT-Tracker, correlation methods or an allocation of the motion path in the picture over a picture sequence taken during the motion. If measuring targets are used, they may be coded in order to simplify following the measuring targets during the motion. The synchronization takes place via the adjustment of the motion profiles.

For each of measuring heads 2, 4, 14, 16 a motion profile is generated in each case from the measured data of each picture recording device 22, 24, 26, 28. Since vehicle 1 is to be regarded for this measurement as a rigid body, the acceleration or deceleration for all recorded geometrical details has to be equal at each point in time. The synchronization in time is produced in that the motion profiles of the geometrical details recorded by individual measuring heads 2, 4, 14, 16 are brought together comparatively so that, at each point in time, the acceleration or deceleration for all recorded geometrical details is the same.

The alternative exemplary embodiments enable a rapid wheel suspension alignment, since it is sufficient to drive vehicle 1 past measuring heads 2, 4, 14, 16 without stopping vehicle 1.

From the measured data, the axis of rotation and the rotational center of wheels 6, 8, 10, 12 may be determined in the coordinate system of the respective measuring head 2, 4, 14, 16, using known methods.

This evaluation may be performed by wheel, i.e. separately for all four wheels 6, 8, 10, 12, by axle, i.e. in common for the oppositely situated wheels 6, 8, 10, 12 of an axle 32, 34, or in common for all the wheels 6, 8, 10, 12. For the evaluation by axle and the evaluation in common for all the wheels 6, 8, 10, 12, a synchronicity in time of the shots has to be produced.

In addition to the geometrical details of wheels 6, 8, 10, 12, geometrical details on the body of vehicle 1 may be recorded, in order to record steering motions and spring oscillations of vehicle 1 and compensate for them mathematically.

As described, the 3D coordinates of each measuring head are able to be determined except for a scale factor, i.e. the shape of the reconstructed 3D point cloud is known, but not its magnitude (see FIG. 2). A common scale is obtained from the adjustment of translation vectors $t_1$, $t_2$, $t_3$ and $t_4$, which describe the motion of the geometrical details in space.

From FIG. 2 one is able to recognize, however, that the scaling to form a common scale leads to no change in the angle between the segments. Therefore, these angles, such as the camber of wheels 6, 8, 10, 12, the single toe of front axle 32 and the total toe of the front and rear axle 32, 34 are independent of the global scale, and are thus able to be determined without knowing the common scale, Measured quantities which require lengths of segments, by contrast, do depend on a common, absolute scale. This applies, for example, to the calculation of the wheel base and the tread width or the vehicle's longitudinal center plane M, which is needed to calculate the single toe of the rear axle.

The knowledge of the common, absolute scale is not required, however, for calculating the single toe of rear axle 34 if measuring heads 2, 4, 14, 16 are situated exactly symmetrically on both sides of vehicle 1 to picture recording devices 22, 24, 26, 28, and the motion of vehicle 1 takes place exactly along a straight line through measuring heads 2, 4, 14, 16. Consequently, by a symmetrical positioning of measuring heads 2, 4, 14, 16, or by a symmetrical alignment of vehicle 1 between the rigidly mounted measuring heads 2, 4, 14, 16, and exact determination of longitudinal center plane M of vehicle 1 is able to be made, and with that, the single toe of rear wheels 10, 12 may be determined exactly.

Figure 3:
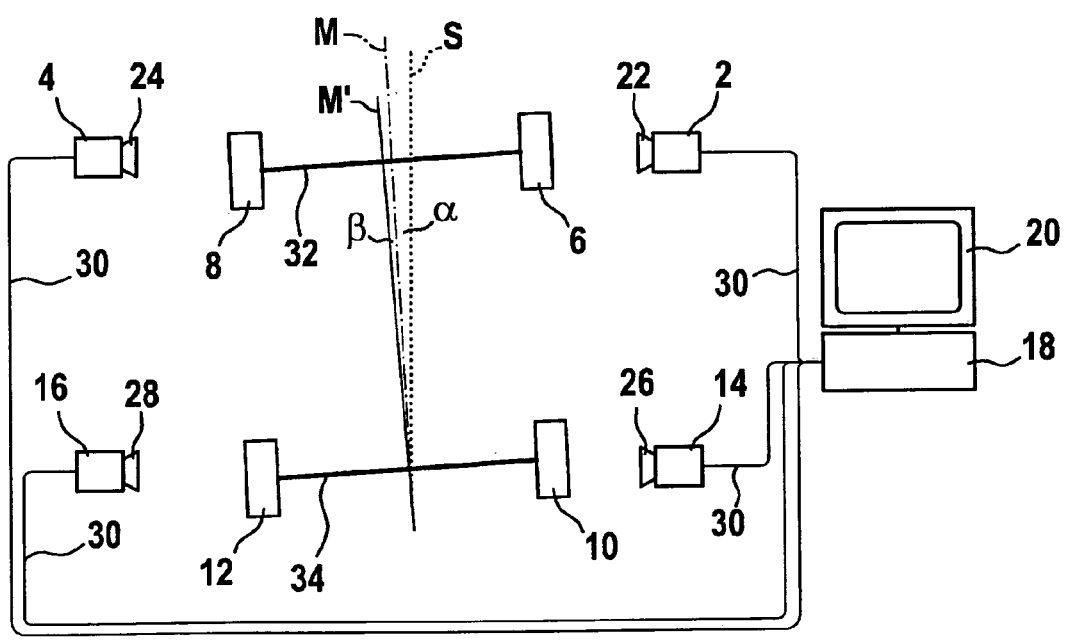
FIG. 3 shows the device for measuring the wheel suspension geometry in FIG. 1, the vehicle's longitudinal center plane deviating from the longitudinal axis of the measuring location coordinate system.

As shown in FIG. 3, under real conditions, such a symmetrical arrangement of measuring heads 2, 4, 14, 16 and vehicle 1, and an exactly parallel and centrical motion of vehicle 1 between measuring heads 2, 4, 14, 16 is able to be implemented only approximately. The deviation from axis of symmetry S corresponds to a slantwise travel by the angle $\alpha$.

Because of slantwise travel $\alpha$, a measuring error $\beta$ is created in the determination of longitudinal center plane M.

This measuring error $\beta$ may be reduced by introducing an absolute scale.

An approximately known scale is frequently sufficient for achieving the desired accuracy in axle alignment. By introducing an at least approximately known scale, the deviation of longitudinal center plane M' of vehicle 1 from the actual longitudinal center plane M of the measuring location is able to held to be sufficiently low. The error that remains may be estimated with the aid of an error formula (angular error $\beta$ of the longitudinal center plane=scale error×angle of slantwise travel $\alpha$). Thus, at a scale error of 1% and a deviation of the longitudinal orientation of vehicle 1 from axis of symmetry S of the measuring location of 3°, the angular error $\beta$ amounts to less than two angular minutes, which is sufficient for many applications.

The approximately known scale also offers the possibility of monitoring the slantwise travel. If a specified maximum slantwise travel angle is exceeded, the measurement may be broken off and the user may be prompted to correct the travel direction or the position of vehicle 1, and to repeat the measurement.

There are various possibilities of introducing an approximately known scale.

Thus, measurement targets may be mounted, at a known distance from one another, on wheels 6, 8, 10, 12 or on wheel adapters fastened on wheels 6, 8, 10, 12. Wheel adapters have a diameter of about 500 mm and use mostly stickers. Even during the manual placing of the measuring targets an accuracy of about 1% is achievable.

Alternatively, the distance covered by vehicle 1 during the movement from initial position A to final position E may be determined in an absolute measure. For this purpose, sensors that are present in vehicle 1, as are used, for example, for ABS and EPS, or a metrically known information, that is permanently installed at the measuring location, may be used.

In one other exemplary embodiment, the speed of vehicle 1 is measured during the motion through speed sensors, and the path covered is determined by integration of the measured speed over time. The speed sensors may be speed sensors present in vehicle 1, for instance, for actuating a tachometer.

What is claimed is:

1. A method for wheel suspension alignment, the method comprising:
    recording at least three geometrical details of one wheel, respectively, of a vehicle standing in an initial position using each of four measuring heads of a wheel suspension alignment system, the wheel suspension alignment system having the four measuring heads situated in a known position with respect to one another, of which each has a monocular picture recording device;
    carrying out a relative motion between the vehicle and the measuring heads from the initial position into at least one further position, the relative position of the measuring heads to one another being known;
    recording at least three geometrical details of one wheel, respectively, of the vehicle standing in the further position using each of the four measuring heads;
    carrying out local 3D reconstructions for determining translation vectors, rotation vectors and wheel rotational angles between the at least two positions, and of wheel rotational centers and wheel rotational axes of the wheels from the recorded geometrical details;
    determining a global scale for the measuring heads by scaling the translation vectors of the wheels, so that the translation vectors have the same length; and
    determining at least one of: a camber, a single toe, or a total toe of the vehicle.

2. The method of claim 1, wherein in each case two of the measuring heads are situated in such a way that they lie opposite to each other symmetrically on both sides of the vehicle, the vehicle is moved through, in parallel to the axis of symmetry, between the oppositely situated measuring heads and in addition, the single toe of the rear wheel of the vehicle is determined.

3. The method of claim 1, wherein additionally a metrically known information is recorded by at least one of the measuring heads, in order to determine a scale factor absolutely, and in addition, a wheel base and a tread width of the vehicle are determined.

4. The method of claim 3, wherein the metrically known information is a distance between two features on the vehicle.

5. The method of claim 3, wherein the metrically known information is a distance covered by the vehicle.

6. The method of claim 5, wherein a speed of the vehicle is determined by speed sensors and the distance covered is determined by an integration of the speed.

7. A method for wheel suspension alignment, the method comprising:
   carrying out a relative motion between a vehicle and four measuring heads of a wheel suspension alignment system at a constant or non-constant speed, the relative position of the measuring heads to one another being known, the wheel suspension alignment system having the four measuring heads situated in a known position with respect to one another, of which each has a monocular picture recording device, picture taking of the measuring heads taking place synchronized in time;
   recording at least three geometrical details of one wheel, respectively, of the vehicle during the execution of the relative motion, using each of the four measuring heads, that are synchronized with one another in time, in at least two positions of the vehicle;
   carrying out local 3D reconstructions for determining translation vectors, rotation vectors and wheel rotational angles between the at least two positions, as well as of wheel rotational centers and wheel rotational axes of the wheels from the recorded geometrical details;
   determining a common global scale for the measuring heads by scaling the translation vectors of the wheels, so that the translation vectors have the same length; and
   determining at least one of: a camber, a single toe, or a total toe of the vehicle.

8. A method for wheel suspension alignment, the method comprising:
   carrying out a relative motion between a vehicle and four measuring heads of a wheel suspension alignment system at a non-constant speed, the relative position of the measuring heads to one another being known, the wheel suspension alignment system having four measuring heads situated in a known position with respect to one another, of which each has a monocular picture recording device;
   recording at least three geometrical details of one wheel, respectively, of the vehicle during the execution of the relative motion, using each of the four measuring heads, that are synchronized with one another, in a plurality of positions of the vehicle;
   carrying out local 3D reconstructions for determining translation vectors, rotation vectors and wheel rotational angles between the positions, as well as wheel rotational centers and wheel rotational axes of the wheels from the recorded geometrical details;
   determining motion profiles of the wheels from the recorded motions of the geometrical details;
   synchronizing the motion profiles of the wheels by adjusting the motion profiles with respect to position, shape and scale; and determining at least one of: a camber, a single toe, or a total toe of the vehicle.

9. A device for aligning the wheel suspension geometry of a vehicle, comprising:
   a system of four measuring heads situated in a known position with respect to one another, of which each has a monocular picture recording device and is equipped, in operation, using the picture recording device, to record in each case at least three geometrical details of one wheel, respectively, of the vehicle standing in an initial position and a further position; and
   an evaluation device, which is equipped, in operation, to determine, from the motion of the recorded geometrical details, translation vectors and rotation vectors of the wheels, to determine a global scale by scaling the translation vectors of the wheels, in such a way that the translation vectors have the same length, and to determine at least one of: a camber, a single toe, or a total toe of the vehicle.

10. A device for aligning the wheel suspension geometry of a vehicle, comprising:
    a system of four measuring heads situated in a known position with respect to one another, of which each has a monocular picture recording device and is equipped so that picture taking of the measuring heads takes place synchronized in time, and using the picture recording device, during operation to record in each case at least three geometrical details of one wheel, respectively, of the vehicle during the execution of a motion of the vehicle at constant or at non-constant speed relative to the measuring heads; and
    an evaluation device, which is equipped, in operation, to determine, from the motion of the recorded geometrical details, translation vectors and rotation vectors of the wheels, to determine a common global scale factor by scaling the translation vectors of the wheels, in such a way that the translation vectors have the same length, and to determine at least one of: a camber, a single toe, or a total toe of the vehicle.

11. A device for aligning the wheel suspension geometry of a vehicle, comprising:
    a system of four measuring heads situated in a known position with respect to one another, of which each has a monocular picture recording device and is equipped, in operation, using the picture recording device, to record in each case at least three geometrical details of one wheel, respectively, of the vehicle during the execution of a motion of the vehicle at non-constant speed relative to the measuring heads; and
    an evaluation device, which is equipped, in operation, to determine motion profiles of the wheels from the motion of the recorded geometrical details, to determine, from the motion of the recorded geometrical details, translation vectors and rotation vectors of the wheels, to synchronize the motion profiles of the wheels by adjusting the motion profiles with respect to position, shape and scale, and to determine at least one of: a camber, a single toe, or a total toe of the vehicle.

* * * * *

UNITED STATES PATENT AND TRADEMARK OFFICE
CERTIFICATE OF CORRECTION

PATENT NO. : 8,522,609 B2  Page 1 of 1
APPLICATION NO. : 12/736368
DATED : September 3, 2013
INVENTOR(S) : Nobis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this

Fifteenth Day of September, 2015

Michelle K. Lee
*Director of the United States Patent and Trademark Office*